March 22, 1960

G. J. H. J. BERNARD 2,929,472

BRACING RINGS FOR AERIAL MASTS

Filed Aug. 24, 1956

INVENTOR.

GUSTAVE JEAN HENRI JOSEPH
BY
BERNARD.

United States Patent Office 2,929,472
Patented Mar. 22, 1960

2,929,472

BRACING RINGS FOR AERIAL MASTS

Gustave Jean Henri Joseph Bernard, Ombret-Rausa, Belgium

Application August 24, 1956, Serial No. 606,166

Claims priority, application Belgium August 25, 1955

2 Claims. (Cl. 189—31.5)

The present invention has for an object improvements in stay rings for aerial masts.

Generally speaking, to ensure good reception, it is necessary to be able to swing the aerial about. It has already been proposed to mount the aerial pivotably at the end of the mast, but these constructions are very costly and necessitate additionally the fixture of a motor at the extremity of the mast, and consequently of an appreciable weight.

It is also preferred to make the mast as a whole movable about its axis, but in practice there has hitherto been a liability to jamming because of the impossibility of balancing the pulls of the bracing wires.

The present invention has for its object the provision of an improved stay ring whereby these inconveniences are avoided.

In the accompanying drawing there is shown, by way of example, one construction of the present invention.

Figure 1:
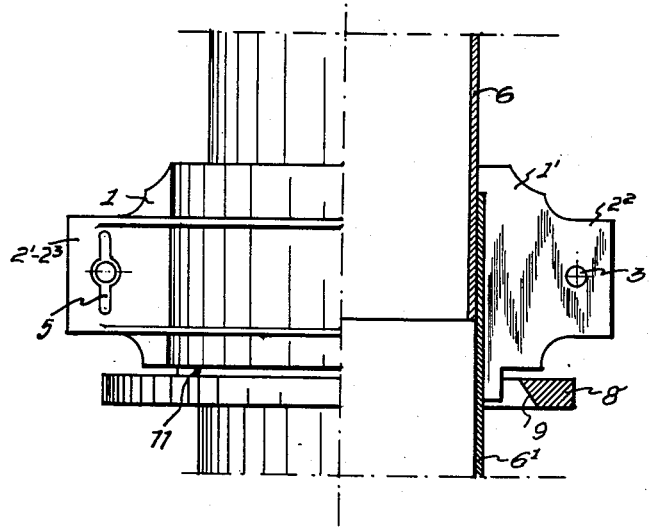
Fig. 1 is a view in elevation and partially in section of a stay ring.
Figure 2:
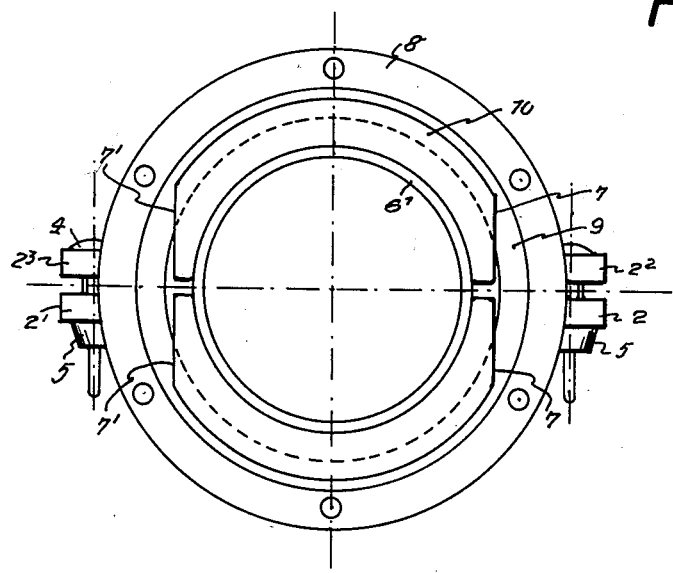
Fig. 2 shows a view from below of the stay ring.

The ring comprises two approximately semi-circular clamp elements 1, $1^1$ having respectively lugs 2, $2^1$, and $2^2$, $2^3$. These lugs are provided with apertures 3 permitting, with the aid of bolts 4 and nuts 5, to tighten the clamp elements onto telescopic tubes 6, $6^1$ forming the mast.

The clamp elements, 1, $1^1$ each include a body portion and a radial outwardly extending flange 10 concentric with the tubes and the upper face of which is conical. The flange is spaced from the body portion and is connected thereto by a neck 11 of smaller diameter. These flange portions do not extend round the full 180° of the clamp, the ends being cut to form parallel facets 7, $7^1$, the distance apart of which is less than the internal diameter of a coupling ring 8 for the usual stays.

By inclining the clamp elements, they can be inserted into the ring and after tightening of the clamp elements the ring is then retained thereon whilst being able to turn freely. The ring 8 has a conical internal surface 9 which seats the cone of the flange portions, in such a manner that sliding is facilitated even if one or the other of the stays exerts on the ring a pull which is greater than the others.

One of the advantages of the invention is the simplicity of construction requiring only a single mould, for the clamp elements which are identical. The ring is also of simple manufacture.

In bad wheather there will not necessarily be any deposit of impurities against the contact faces of the ring and flange since, during the rotation of the ring with respect to the flange, the faces thereof continually scrape together. Similarly, water passes easily out of an escape path and is not retained on the ring.

The invention has been described and illustrated solely by way of example and in no wise in a limiting sense, and modifications could be included therein without exceeding the scope of the invention as defined in the following claims. For example, the flange of the clamp elements could be replaced by a plurality of radial fingers serving the same purpose.

I claim:

1. A stay ring for masts of circular section, comprising two part-cylindrical clamp elements to seat about the mast leaving circumferential gaps at diametrically opposite positions, each clamp element including a body portion and a radial outwardly-extending flange spaced from said body portion and a neck of smaller diameter than said flange and body portion connecting said flange and body portion, means for forcing the clamp elements towards each other in the direction to close the gaps and engage said elements in clamping manner about the mast, and a ring of greater internal diameter than the neck but of smaller internal diameter than the body portion and flange, said ring being disposed loosely about the neck between the flange and body portion and seated on the flange to serve for attachment of stays, the part-cylindrical clamp elements being cut away along parallel planes normal to their plane of separation so as to be of less width, measured in their plane of separation, than the internal diameter of the ring, whereby said clamp elements can each be introduced into and passed through the ring by tilting in such a manner that the plane of symmetry of the flange becomes inclined with respect to the plane of symmetry of the ring.

2. A stay ring for masts of circular section, comprising two part-cylindrical clamp elements to seat about the mast leaving circumferential gaps at diametrically opposite positions, each clamp element including a body portion and a radial outwardly-extending flange spaced from said body portion and a neck of smaller diameter than said flange and body portion connecting said flange and body portion, said flange having a part-conical bearing surface tapering towards the body portion, means for forcing the clamp elements towards each other in the direction to close the gaps and engage said elements in clamping manner about the mast, and a ring of greater internal diameter than the neck but of smaller diameter than the body portion and flange, said ring having a correspondingly tapered part-conical bearing surface and being seated loosely about the neck between the flange and body portion, said ring resting by its bearing surface on the bearing surface of the flange to serve for the attachment of stays, the part-cylindrical clamp elements being cut away along parallel planes normal to their plane of separation so as to be of less width, measured in their plane of separation, than the internal diameter of the ring, whereby said clamp elements can each be introduced into and passed through the ring by tilting in such a manner that the plane of symmetry of the flange becomes inclined with respect to the plane of symmetry of the ring.

References Cited in the file of this patent

UNITED STATES PATENTS

| | | |
|---|---|---|
| 2,143,005 | Green | Jan. 10, 1939 |
| 2,170,679 | Dickerson | Aug. 22, 1939 |
| 2,739,673 | Foster | Mar. 27, 1956 |

FOREIGN PATENTS

| | | |
|---|---|---|
| 521,747 | Belgium | Aug. 14, 1953 |